United States Patent
Kogure et al.

(10) Patent No.: US 7,646,883 B2
(45) Date of Patent: Jan. 12, 2010

(54) DIGITAL WATERMARK DETECTION METHOD AND APPARATUS

(75) Inventors: Nakaba Kogure, Zama (JP); Noboru Yamaguchi, Yashio (JP); Tomoo Yamakage, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 687 days.

(21) Appl. No.: 11/467,804

(22) Filed: Aug. 28, 2006

(65) Prior Publication Data

US 2007/0195988 A1    Aug. 23, 2007

(30) Foreign Application Priority Data

Feb. 17, 2006   (JP)   .............................. 2006-040846

(51) Int. Cl.
G06K 9/00    (2006.01)
H04L 9/32    (2006.01)
H04N 1/40    (2006.01)

(52) U.S. Cl. .......................... 382/100; 380/54; 713/176; 358/3.28

(58) Field of Classification Search ........................ None
See application file for complete search history.

(56) References Cited

U.S. PATENT DOCUMENTS

| | | |
|---|---|---|
| 2003/0091213 A1 | 5/2003 | Yamakage et al. |
| 2004/0117629 A1 | 6/2004 | Koto et al. |
| 2004/0194126 A1 | 9/2004 | Kogure et al. |
| 2005/0053259 A1 | 3/2005 | Asano et al. |

FOREIGN PATENT DOCUMENTS

| | | |
|---|---|---|
| JP | 9-22406 | 1/1997 |
| JP | 2002-247344 | 8/2002 |
| JP | 2002-325233 | 11/2002 |
| JP | 2005-252491 | 9/2005 |

OTHER PUBLICATIONS

U.S. Appl. No. 12/235,196, filed Sep. 22, 2008, Kogure, et al.

(Continued)

*Primary Examiner*—Charles Kim
(74) *Attorney, Agent, or Firm*—Oblon, Spivak, McClelland, Maier & Neustadt, L.L.P.

(57) ABSTRACT

A digital watermark detection apparatus includes an extraction unit extracting a specific frequency component signal from an input image signal, a first transformation unit orthogonal-transforming the image signal, a second transformation unit orthogonal-transforming the specific frequency component signal, a combination unit combining first and second transformed image signals from the first and second transformation units, a third transformation unit orthogonal-transforming a combined image signal, an estimation unit estimating embedded watermark information by searching for a peak appearing in a third transformed image signal of the third transformation unit, and a compressor compressing a target signal in amplitude based on a compression characteristic varying according to an amplitude and frequency of the target signal to obtain a compression signal, the target signal formed of at least one of the first transformed image signal, the second transformed image signal and the combined image signal.

15 Claims, 9 Drawing Sheets

OTHER PUBLICATIONS

U.S. Appl. No. 11/337,806, filed Jan. 24, 2006, Nakaba Kogure.
U.S. Appl. No. 11/357,427, filed Feb. 21, 2006, Nakaba Kogure.
U.S. Appl. No. 10/626,610, filed Jul. 25, 2003, Wataru Asano, et al.
Ton Kalker, et al., "Efficient Detection of a Spatial Spread-Spectrum Watermark in MPEG Video Streams", IEEE International Conference, XP 010530644, Sep. 10, 2000, pp. 434-437.
Rade Petrovic, "Audio Signal Watermarking Based on Replica Modulation", Telsiks 2001, XP 010560926, vol. 1, Sep. 19. 2001, pp. 227-234.
Frank Hartung, et al., "Multimedia Watermarking Techniques", Proceedings of the IEEE, XP 011044229, vol. 87, No. 7, Jul. 1999, pp. 1079-1107.
Koichi Ito, et al., "A Fingerprint Matching Algorithm Using Phase-Only Correlation", IEICE Trans. Fundamentals, XP 001190008, vol. E87-A, No. 3, Mar. 2004, pp. 682-691.

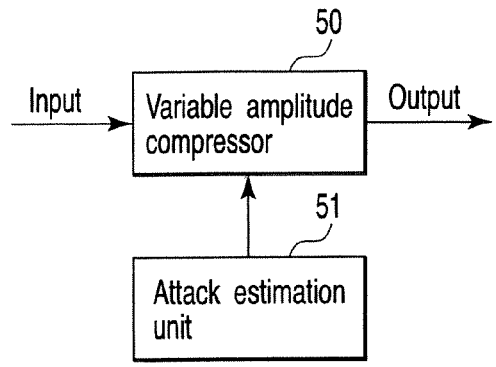
F I G. 17
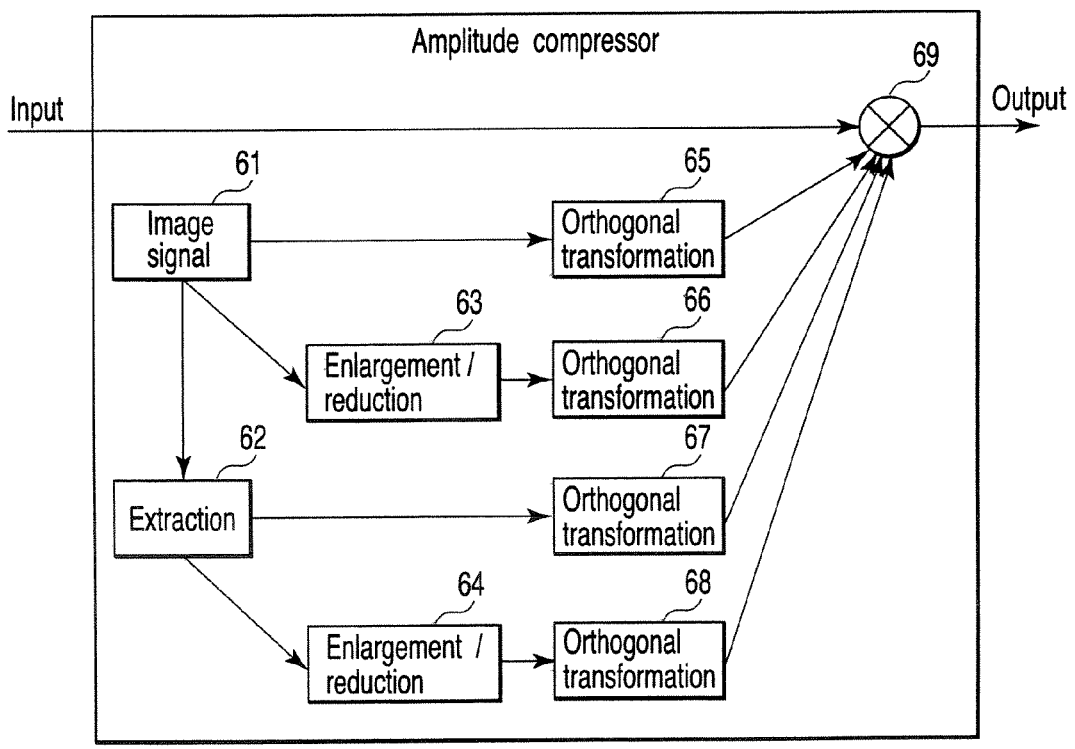
F I G. 18

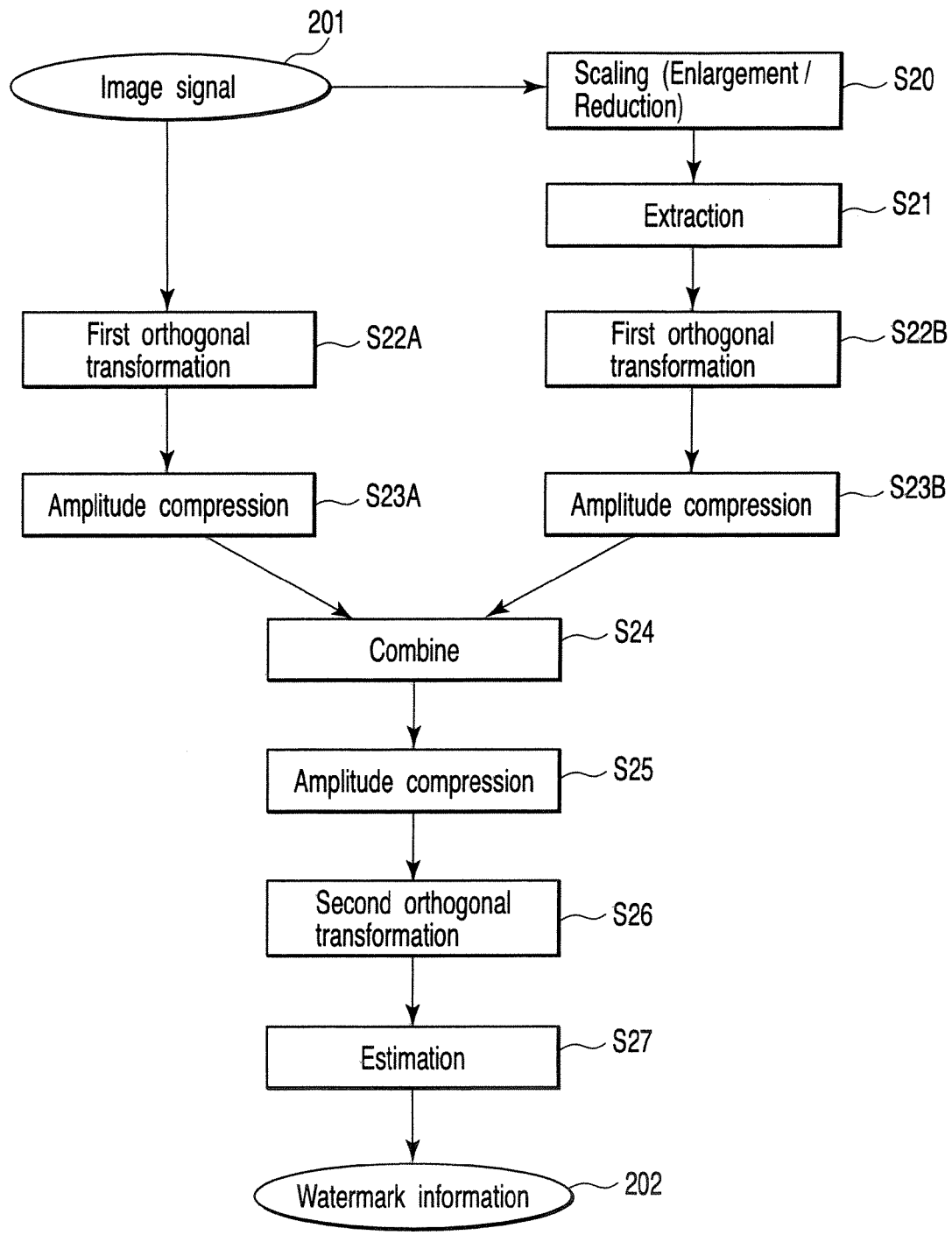
F I G. 21

DIGITAL WATERMARK DETECTION METHOD AND APPARATUS

CROSS-REFERENCE TO RELATED APPLICATIONS

This application is based upon and claims the benefit of priority from prior Japanese Patent Application No. 2006-040846, filed Feb. 17, 2006, the entire contents of which are incorporated herein by reference.

BACKGROUND OF THE INVENTION

1. Field of the Invention

The present invention relates to a digital watermark detection method and apparatus useful in preventing illegal copies of a digital video signal provided via, for example, a recording medium.

2. Description of the Related Art

Due to the prevalence of apparatuses for recording and playing back digital image data, such as a digital video tape recorder (VTR), a digital versatile disk (DVD), and the like, various digital moving images which can be played back by these apparatuses are being provided. Moreover, various digital moving images are distributed via digital television broadcast via the Internet, broadcast satellite, communication satellite, and the like, enabling users to enjoy high-quality digital moving images.

It is easy to form high-quality copies from digital moving images on the digital signal level. Therefore, unless there is some kind of copy protection or copy control applied to the digital moving images, they may be at risk for unrestricted formation of copies. Accordingly, in order to prevent illicit copies of digital moving images or restrict the generation number of copies formed by authorized users, a method to restrict copies by appending information for copy control to each digital moving image and preventing illicit copies or restricting copies using this appended information is being devised.

Digital watermarking is known as a technique for superposing additional information to a digital moving image as such. In digital watermarking, information such as identification information of the copyright owner or user of contents, right information of the copyright owner, use conditions of contents, secret information required upon using the contents, the aforementioned copy control information, or the like (such information will be referred to as watermark information hereinafter) is embedded in contents including audio data, music data, moving image data, still image data, which has been converted into digital data, so as not to be easily perceived. By detecting the embedded watermark information from the contents later as needed, copyright protection, including use control and copy control, can be achieved, and further use of the contents is possible.

Various methods have been proposed for a digital watermarking scheme. As one of them, a method that applies a spread spectrum technique is known. In this method, watermark information is embedded in a digital moving image in the following sequence.

In step E1, an image signal undergoes spread spectrum by being multiplied by a PN (Pseudorandom Noise) sequence.

In step E2, the image signal after spread spectrum undergoes frequency transformation (e.g., DCT).

In step E3, watermark information is embedded in the image signal by changing the values of specific frequency components.

In step E4, the image signal undergoes inverse frequency transformation (e.g., IDCT).

In step E5, the image signal undergoes inversely spread spectrum (the image signal is multiplied by the same PN sequence as in step E1).

Watermark information is detected in the following sequence, from the digital moving image, in which the watermark information has been embedded in the above sequence.

In step D1, the image signal undergoes spread spectrum by being multiplied by a PN (Pseudorandom Noise) sequence (the same PN sequence as in step E1).

In step D2, the image signal after spread spectrum undergoes frequency transformation (e.g., DCT).

In step D3, the embedded watermark information is extracted from the image signal while paying attention to the values of specific frequency components.

Meanwhile, in JP-A 2002-325233 (KOKAI), particularly claim 2 and FIG. 7 disclose a technique to embed a specific frequency component of an embedding target image to the embedding target image after controlling the phase and amplitude of the specific frequency component in accordance with the watermark information, and also a technique to detect the watermark information embedded thereby. Particularly, when detecting the watermark information, the correlation (cross-correlation or phase only correlation) between an input image (watermark embedded image) and the specific frequency component extracted from the input image is utilized in order to estimate the embedded watermark information from the peak of a correlation value.

When digital watermarking is applied to digital productions for the purpose of prevention of illicit use, a characteristic (robustness) that can prevent watermark information from being lost or tampered with due to deliberate attacks which are normally carried out on digital productions must be provided to digital watermarking. As an example of attacks which disrupt watermark information detection for digital images embedded with watermark information, cut-out and scaling (enlargement/reduction) of an image are known.

When a digital image that has suffered such attacks is input, the conventional technique applying spread spectrum recovers synchronization of a PN sequence by executing a process for estimating a PN sequence used in step E1 at the time of embedding upon detection of watermark information. After that, the processes in steps D1 to D3 are executed to extract the embedded watermark information.

However, in order to recover synchronization of the PN sequence, a search must be conducted in which a synchronization recovery process for a plurality of candidates of PN sequences is attempted, and a candidate that has achieved the synchronization recovery properly is adopted. For this purpose, calculation amount and circuit dimension increase. Further, since the watermark information of a digital image having undergone attack is weakened, even if the contents (cut-out, scaling, etc.) of the attack is identified and a corresponding detection is carried out, it is difficult to detect watermark information properly.

When detecting digital watermarking by utilizing cross-correlation between the input image and the extracted specific frequency component, it will be possible to obtain a relatively strong robustness while suppressing the increase in calculation amount and circuit scale against the attack from, such as, cut-out and scaling of an image. However, the peak of the correlation value generated by cross-correlation is not so steep.

Meanwhile, in JP-A2005-252491 (KOKAI), according to a digital watermarking detection technique utilizing a phase only correlation as described particularly in claim 1 and FIG.

1, a steep peak appears in the correlation value since the correlation is taken by fixing the amplitude of each signal of the input image and the extracted specific frequency component. If the peak of the correlation value is steep, it will be easy to estimate the watermark information. However, if the amplitude is fixed, the amplitude error between the signals before and after attack increases. It is preferable that this amplitude error is kept to a minimum in order to increase the robustness against attacks.

BRIEF SUMMARY OF THE INVENTION

An aspect of the present invention provides a digital watermark detection apparatus includes an extraction unit extracting a specific frequency component signal from an input image signal; a first transformation unit orthogonal-transforming the image signal; a second transformation unit orthogonal-transforming the specific frequency component signal; a combination unit combining first and second transformed image signals from the first and second transformation units; a third transformation unit orthogonal-transforming a combined image signal; an estimation unit estimating embedded watermark information by searching for a peak appearing in a third transformed image signal of the third transformation unit; and a compressor compressing a target signal in amplitude based on a compression characteristic varying according to an amplitude and frequency of the target signal to obtain a compression signal, the target signal formed of at least one of the first transformed image signal, the second transformed image signal and the combined image signal.

BRIEF DESCRIPTION OF THE SEVERAL VIEWS OF THE DRAWING

FIG. 17 is a block diagram showing a third specific example of the amplitude compressor.

FIG. 18 is a block diagram showing a fourth specific example of the amplitude compressor.

FIG. 21 is a flow chart showing a digital watermark detection sequence of the second embodiment.

DETAILED DESCRIPTION OF THE INVENTION

First Embodiment (Digital Watermark Embedding Apparatus)

Figure 1:
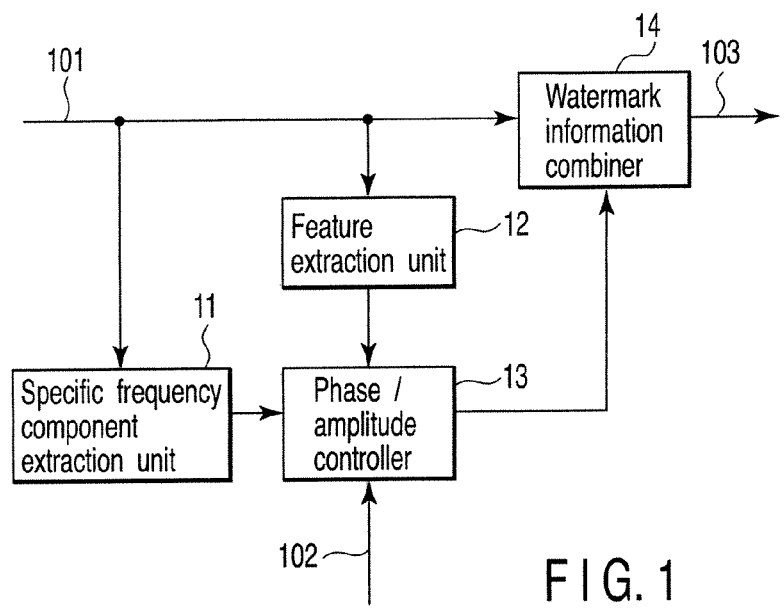
FIG. 1 is a block diagram of a digital watermark embedding apparatus according to a first embodiment.

There will now be described a digital watermark embedding apparatus according to the first embodiment using FIG. 1. The digital watermark embedding apparatus of FIG. 1 is supplied with a signal 101 of an image to be embedded with watermark information (referred to as embedding target image hereafter), e.g., a digitalized image signal of a motion image or still image. The embedding target image signal 101 may include both a luminance signal and a color difference signal, or only a luminance signal. The embedding target image signal 101 is input to a specific frequency component extraction unit 11, a feature extraction unit 12 and a watermark information combiner 14.

The specific frequency component extraction unit 11 includes a digital filter of a frequency domain, such as a lowpass filter or a highpass filter possessing a predetermined cutoff frequency, or a bandpass filter possessing a predetermined passband center frequency, and extracts a specific frequency component, such as a relatively high frequency component, from the embedding target image signal 101. An output signal from the specific frequency component extraction unit 11 is hereinafter referred to as a specific frequency component signal.

The specific frequency component signal output from the specific frequency component extraction unit 11 is input to a phase/amplitude controller 13 where either or both of the phase and amplitude are controlled. Digital information, i.e., watermark information 102, to be embedded in the embedding target image signal 101 is given to the phase/amplitude controller 13. The phase/amplitude controller 13 is configured to perform phase control or amplitude control in a predetermined specific control quantity to the specific frequency component signal.

Figure 2:
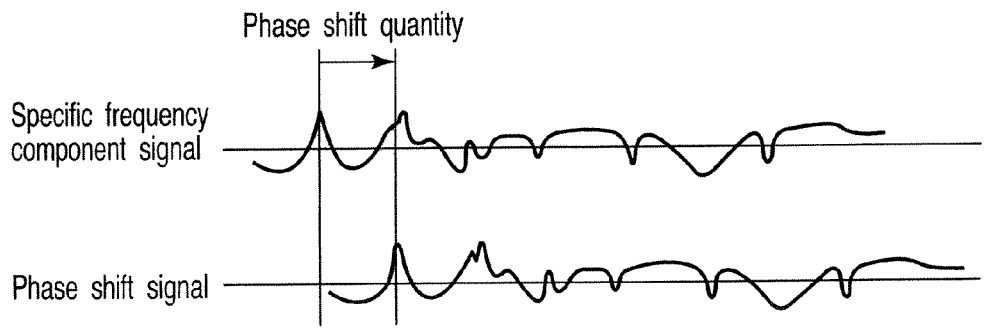
FIG. 2 illustrates a phase shift carried out in a phase and amplitude controller of the first embodiment.

The phase control performed by the phase/amplitude controller 13 can be realized by, for example, a single or a plurality of digital phase shifters. The phase control quantity is given in accordance with the phase shift quantity of the phase shifter. FIG. 2 shows an aspect of a phase shift according to the phase/amplitude controller 13. In this example, the specific frequency component signal simply undergoes a phase shift by maintaining a wave pattern. The amplitude control performed by the phase/amplitude controller 13 is realized by, for example, a single or a plurality of exclusive circuits or digital multipliers. An amplitude control quantity is given in accordance with the coefficient by which the specific frequency component signal is multiplied. The phase control quantity (phase shift quantity) and the amplitude control quantity (coefficient) of the phase/amplitude controller 13 are controlled in accordance with the watermark information 102.

Meanwhile, the feature quantity extraction unit 12 extracts a feature quantity, e.g., an activity showing the complexity of an image, of the embedding target image signal 101. The information on feature quantity is input to the phase/amplitude controller 13, where the phase control quantity (phase shift quantity) and/or the amplitude control quantity (coefficient) are controlled in accordance with the input feature quantity. Further, the feature quantity extraction unit 12 is not fundamental, therefore, may be omitted.

The specific frequency component signal undergone phase control and amplitude control by the phase/amplitude controller 13 is supplied to the watermark information combiner 14 which comprises a digital adder and is combined with the embedding target image signal 101. In other words, the specific frequency component signal extracted by the specific frequency component extraction unit 11 undergoes phase control and amplitude control specific to the digital watermark embedding apparatus by the phase/amplitude controller 13 while either or both of the phase control quantity and the amplitude control quantity is controlled by the watermark information 102. As a result, at the watermark information combiner 14, a watermark embedded image 103 in which the embedding target image signal 101 is embedded with the watermark information 102 is generated.

A plurality of channel specific frequency component signals may be extracted by the specific frequency component extraction unit 11 and undergone phase control and amplitude control by the phase/amplitude controller 13. In such a case, the plurality of channel specific frequency component signals are combined with the embedding target image signal 101 by the watermark information combiner 14.

The thus-obtained watermark embedded image signal 103 is recorded on a recording medium by, for example, a digital image recording/reproducing apparatus, such as a DVD system, or transmitted via a transmission medium, such as the Internet, a broadcasting satellite or a communication satellite.

(Digital Watermark Detection Apparatus)

There will be explained a digital watermark detection apparatus for detecting watermark information from a watermark embedded image signal using FIG. 3.

Figure 3:
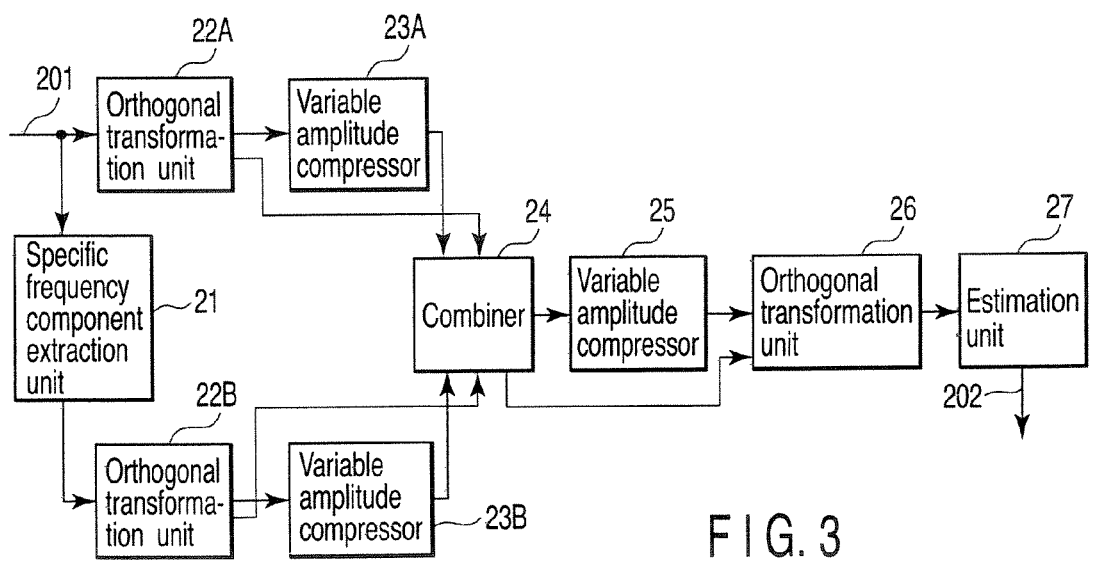
FIG. 3 is a block diagram of a digital watermark detection apparatus according to the first embodiment.

The digital watermark detection apparatus in FIG. 3 receives a watermark embedded image signal 201 generated by the digital watermark embedding apparatus shown in FIG. 1 and received through a recording medium or a transmission medium as an input image signal. At this point, suppose that a digital signal of "1" or "0" has been embedded as the watermark information.

The watermark embedded image signal 201 is input to a specific frequency component extraction unit 21 and an orthogonal transformation unit 22A. The specific frequency component extraction unit 21 includes a digital filter of a frequency domain equivalent to that included in the specific frequency component extraction unit 11 in the digital watermark embedding apparatus shown in FIG. 1. The digital filter of a frequency domain is, for example, a lowpass filter or a highpass filter possessing a predetermined cutoff frequency, or a bandpass filter possessing a predetermined passband center frequency. The specific frequency component extraction unit 21 extracts a specific frequency component, such as a relatively high frequency component, from the watermark embedded image signal 201 and outputs the specific frequency component signal. The specific frequency component extraction unit 21 may extract all frequency components from the watermark embedded image signal 201.

The orthogonal transformation units 22A and 22B perform orthogonal transformation on the watermark embedded image signal 201 and the specific frequency component signal from the specific frequency component extraction unit 21 respectively. An amplitude component and a phase component are output separately from the orthogonal transformation units 22A and 22B. The amplitude components output from the orthogonal transformation units 22A and 22B are input to a complex addition unit 24 through variable amplitude compressors 23A and 23B respectively. The orthogonal transformation units 22A and 22B input the phase components directly to the complex addition unit 24. Accordingly, the complex addition unit 24 performs complex addition on signals obtained by performing orthogonal transformation on each of the watermark embedded image signal 201 and the specific frequency component signal from the specific frequency component extraction unit 21. The variable amplitude compressors 23A and 23B will be explained later on.

The complex addition unit 24 outputs the amplitude component and the phase component of the added signal separately. The amplitude component output from the complex addition unit 24 is input to an orthogonal transformation unit 26 via a variable amplitude compressor 25. The phase component output from the complex addition unit 24 is input directly to the orthogonal transformation unit 26. The orthogonal transformation unit 26 performs a second orthogonal transformation on the input signals comprised of the amplitude component and phase component. The second orthogonal transformation is the same or inverse transformation of the first transformation, in which case, if, for example, a Fast Fourier Transformation (FFT) is carried out as the first orthogonal transformation, the orthogonal transformation unit 26 carries out an FFT or an inverse FFT as the second orthogonal transformation.

The output signal from the orthogonal transformation unit 26 is input to an estimation unit 27. The estimation unit 27 estimates the watermark information embedded in the watermark embedded image signal 201 and outputs the estimated watermark information 202.

The variable amplitude compressors 23A, 23B and 25 each comprise an amplitude compressor whose compression characteristic is variable. Specifically, the variable amplitude compressors 23A, 23B and 25 each perform amplitude compression with a compression characteristic which varies in response to at least one of the level of amplitude of the input signal and frequency thereof.

(Digital Watermark Detection Sequence)

Figure 4:
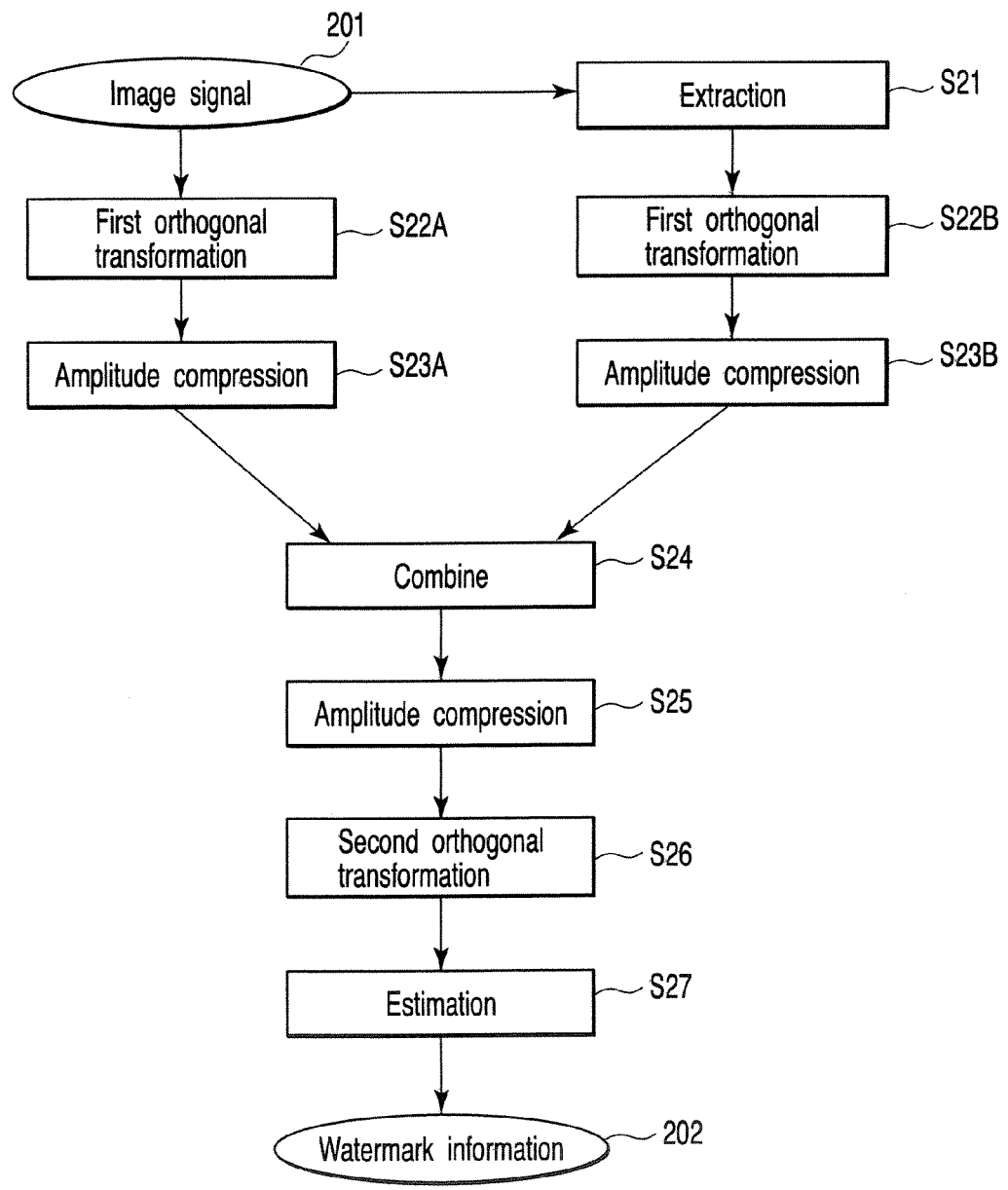
FIG. 4 is a flow chart showing a digital watermark detection sequence of the first embodiment.

The sequence of digital watermark detection method according to the present embodiment will be explained by using the flow chart shown in FIG. 4.

Firstly, only the specific frequency component is extracted from the watermark embedded image signal 201, and a specific frequency component signal is output thereby (step S21). The watermark embedded image signal 201 and specific frequency component signal are subjected to the first orthogonal transformation, e.g., an FFT, by the orthogonal transformation units 22A and 22B (steps S22A and S22B).

The amplitude components obtained in steps S22A and S22B are subjected to amplitude compression with the compression characteristic which varies depending on the amplitude and frequency (steps S23A and 23B). The two amplitude components obtained by amplitude compression are subjected to complex addition with the phase components obtained by the steps S22A and S22B (step S24).

The amplitude component of the signal obtained by the complex addition in step S24 is subjected to amplitude compression with the compression characteristic which varies in response to the amplitude and frequency (step S25). The signal obtained by the amplitude compression carried out in step S25 is then subjected to the second orthogonal transformation, in which, for example, an FFT or inverse FFT is performed if the first orthogonal transformation is performed by FFT (step S26). Watermark information 202 is estimated from the signal obtained by the second orthogonal transformation (phase-only correlation value), and is output (step S27).

Figure 5:
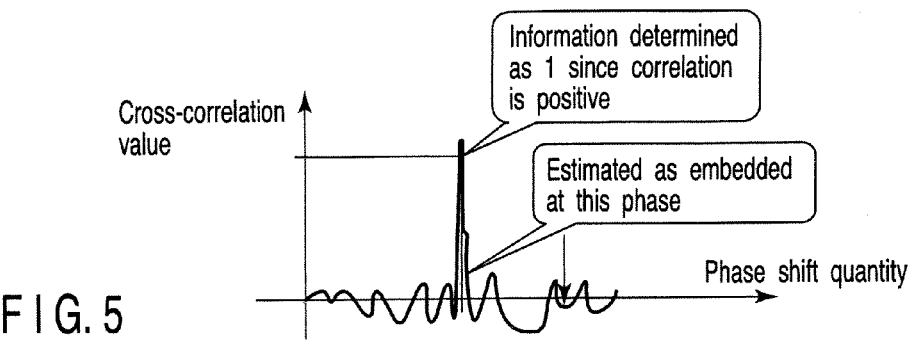
FIG. 5 illustrates a peak search of correlation value and watermark information detection example of the first embodiment.

There will be described the watermark information estimation method carried out by the estimation unit 27 using FIGS. 2 and 5. As mentioned above, suppose that a digital signal "1" or "0" is embedded as the watermark information 102. The signal of the phase-only correlation value is input to the estimation unit 27 from the orthogonal transformation unit 26. While the estimation unit 27 phase-shifts the input signal as shown in FIG. 2, it calculates a cross-correlation value between the phase-shifted input signal and the input signal not undergone phase shift. FIG. 5 shows the relation between the cross-correlation value and the phase shift quantity obtained by this calculation. When observing the change in the cross-correlation value, a peak appears at a point of a certain phase shift quantity. The polar character of this peak indicates the watermark information 202. For instance, if the watermark embedded image signal 201 has undergone scaling attack, the phase shift quantity possessed by the specific frequency component signal becomes a different value from that provided to the specific frequency component signal at the digital watermark embedding apparatus.

Therefore, in the present embodiment, the phase shift quantity is shifted continuously or stepwise by the estimation unit 27, the peak of the cross-correlation value output thereby is searched for, and the watermark information is estimated and detected from the polar characteristic of the searched out peak. The peak of the cross-correlation value takes a value of either positive or negative depending on the value of the watermark information. For instance, in the example of FIG. 5, if the peak of the cross-correlation value is positive, the watermark information is "1". If the peak is negative, the watermark information is "0". Thus, even for images having undergone scaling attacks, the estimation unit 27 estimates the watermark information properly, and outputs the detected watermark information 202.

As described, in the first embodiment, the specific frequency component signal is extracted from the watermark embedded image signal, and the watermark information is detected by the cross-correlation on the phase-only correlation value between this specific frequency component signal and the watermark embedded image signal. In such a case, the peak of the cross-correlation value can be searched for by carrying out correlated calculation while changing the phase shift quantity of the specific frequency component signal. Therefore, the watermark information can be easily detected even from an embedded image signal having undergone a scaling attack.

<Phase-Only Correlation>

Figure 6:
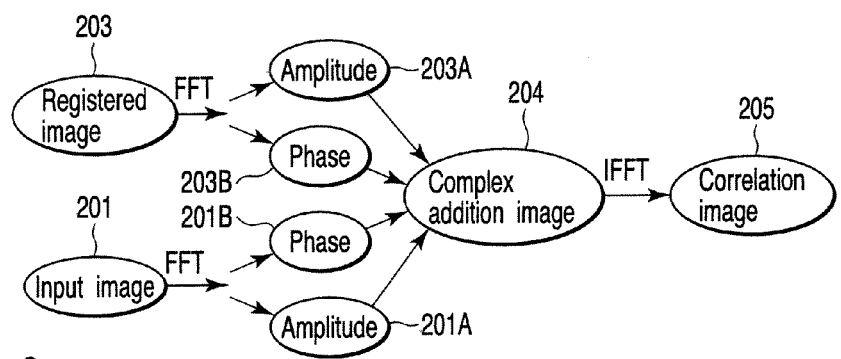
FIG. 6 illustrates a phase only correlation.

The method for correlated calculation by the first orthogonal transformation units 22A and 22B, complex addition unit 24 and the second orthogonal transformation unit 26 (steps S22A and 22B, and S24 and S26) is referred to as phase-only correlation (POC). In explanation by reference to FIG. 6, a phase-only correlation is a method for calculating the correlation (resemblance) between the original image (registered image) signal 203 and the input image signal 201 to be collated. Firstly, the registered image signal 203 converted into a digital signal is divided into amplitude information 203A (contrasting density data) and phase information 203B (image outline data) by mathematical processing under Fourier transformation. Equivalently, the input image signal 201 converted into a digital signal is divided into amplitude information 201A (contrasting density data) and phase information 201B (image outline data) by mathematical processing under Fourier transformation.

Secondly, the phase information 203B of the registered image signal 203 is subjected to amplitude compression. This is to collate the phase information 203B of the registered image signal 203 to the phase information 201B of the input image signal 201. In other words, this is to process the correlation by using only the phase information and without using amplitude information which does not include shape information between the registered image signal 203 and input image signal 201. For amplitude compression, generally, the amplitude is fixed as 1. Similarly, the phase information 201B of the input image signal 201 is subject to amplitude compression as well.

Lastly, a complex addition image signal 204 is produced from each of the phase information 203B and 201B of the registered image signal 203 and the input image signal 201. The complex addition image signal 204 is subject to inverse Fourier transformation to obtain a correlation image signal 205. Such a phase-only correlation is completely different from the general two-dimensional correlation method and feature extraction method using amplitude information, and is characterized as being robust over disturbance and free from major mistakes.

As mentioned above, in the usual phase-only correlation, the amplitude of a signal is fixed at 1 over all frequency bands. However, when assuming the case of an attack, such as cutout or scaling of an image, fixing the amplitude of a signal will increase the amplitude error before and after attack and make it less tolerant to attacks. Therefore, in the present embodiment, in order to reduce influence from attacks upon amplitude compression, amplitude characteristics are switched over in response to the amplitude range and frequency band of the input signal.

Detailed explanations of specific examples of variable amplitude compressors 23A, 23B and 25 are as follows.

FIRST SPECIFIC EXAMPLE OF A VARIABLE AMPLITUDE COMPRESSOR

Figure 7:
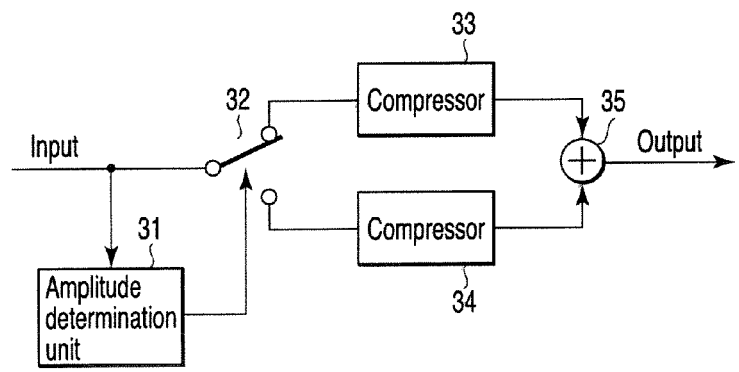
FIG. 7 is a block diagram showing a first specific example of an amplitude compressor.

The variable amplitude compressor shown in FIG. 7 is configured to change compression characteristics in response to the amplitude of an input signal, and possesses an amplitude determination unit 31, a switch 32, amplitude compressors 33 and 34 each having a fixed compression ratio, and an adder 35. The amplitude determination unit 31 determines the amplitude of an input signal of the variable amplitude compressor with respect to a threshold. By switching over the switch 32 in accordance with the determination result from the determination unit 31, the input signal is input to either one of the amplitude compressors 33 and 34. The adder 35 adds output signals from the amplitude compressors 33 and 34, and outputs an addition signal as the output signal of the variable amplitude compressor.

Figure 8A:
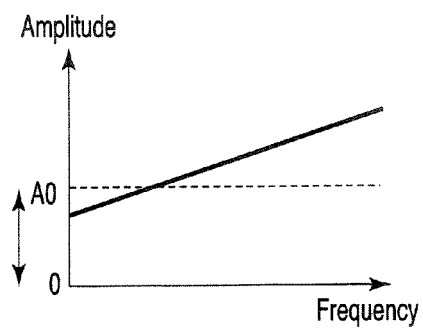
FIGS. 8A and 8B illustrate examples of compression characteristics of the amplitude compressor of FIG. 7.
Figure 8B:
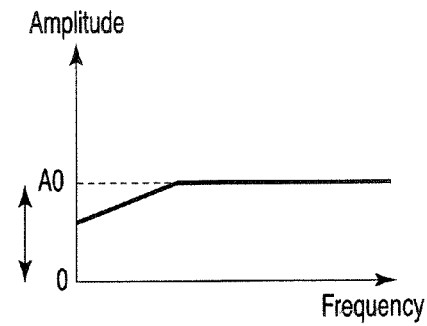

By using FIGS. 8A and 8B, the following shows that the amplitude compression can reduce influence from attacks. The following considers the case in which a signal of an amplitude characteristic as shown in FIG. 8A is input to the amplitude compressor. When the amplitude of an input signal has increased by α from A over all frequency bands due to an attack, suppose that the amplitude compressor compresses the amplitude of an output signal by a fixed value 1 over all frequency bands. In such a case, the influence on the amplitude caused by an attack is as follows:

$$\frac{A}{A+\alpha} - \frac{A}{A} = \frac{-\alpha}{A+\alpha} \quad (1)$$

Equation (1) shows that the influence from an attack increases with decrease of the amplitude A of the input signal.

In a usual phase only correlation, compression is carried out by the variable amplitude compressors 23A and 23B to fix the amplitude of the output signal at 1 with respect to the amplitude transition of the input signal. This falls under a method of performing no compression (no action) by means of the variable amplitude compressor 25. Accordingly, as shown in the equation (1), the smaller the amplitude A of the input signal is, the more it suffers the influence from attack.

Meanwhile, in the case that the amplitude of the input signal is smaller than a certain value A0 as shown in FIG. 8B, if the amplitude compressor does not compress the amplitude of the input signal, the influence from attack can be curbed to the following equation at maximum.

$$\frac{-\alpha}{A_0+\alpha} \quad (2)$$

In the present embodiment, the influence caused by attack can be reduced by performing amplitude compression as shown in, for example, FIG. 8B using at least one of the variable amplitude compressors 23A, 23B and 25.

Figure 9:
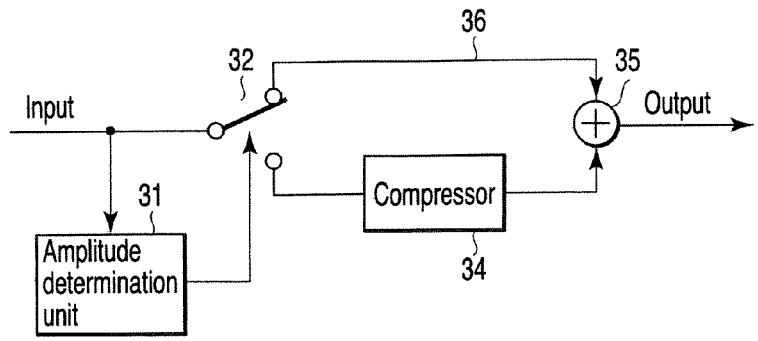
FIG. 9 is a block diagram showing an amplitude compressor obtained by simplifying the amplitude compressor of FIG. 7 corresponding to the compression characteristics of FIGS. 8A and 8B.

In other words, when a signal having an amplitude characteristic (amplitude frequency characteristic) as shown in FIG. 8A is input to the variable amplitude compressor, the amplitude determination unit 31 determines whether or not the amplitude of the input signal is larger than the threshold value (here, A0). Depending on whether the amplitude is smaller or larger than A0, the switch 32 changes the compression characteristic. As shown in FIG. 8B, for example, if the amplitude of the input signal is smaller than the threshold value A0, the amplitude compressor 33 does not perform amplitude compression, and if the amplitude of the input signal is larger than A0, the amplitude compressor 34 performs amplitude compression by compressing the amplitude of the output signal to a fixed value (A0). In other words, amplitude compression is not performed in an amplitude range where the amplitude of the input signal is smaller than A0, but is performed in an amplitude range larger than A0. Since the amplitude compressor 33 in FIG. 7 does not perform amplitude compression in the compression characteristics shown in FIG. 8B, this compression characteristic may be achieved by replacing the amplitude compressor 33 with a direct pass 36 as shown in FIG. 9.

As described, in an amplitude range where the amplitude of an input signal is larger than A0, by compressing the amplitude of the output signal to a fixed value, a correlation independent of an amplitude but dependent on only a phase can be obtained. Consequently, a steep peak is generated by an inverse orthogonal transformation, and the watermark information can be easily detected thereby. Meanwhile, in the amplitude range where the amplitude of the input signal is smaller than A0, i.e., an amplitude range where the influence from an attack is more significant, by not compressing the amplitude of the input signal, the watermark information can be detected while curbing the influence from an attack. Here, as an example, the amplitude compressor 33 in FIG. 7 is explained as not performing amplitude compression. However, the amplitude compressor 33 may perform amplitude compression by a compression ratio smaller than the amplitude compressor 34.

SECOND SPECIFIC EXAMPLE OF A VARIABLE AMPLITUDE COMPRESSOR

Figure 10:
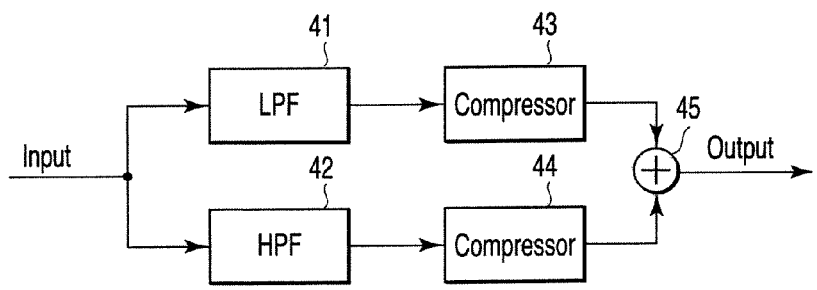
FIG. 10 is a block diagram showing a second specific example of the amplitude compressor.

The variable amplitude compressor shown in FIG. 10 is configured to change compression characteristics in response to the frequency of an input signal, and possesses a lowpass filter (LPF) 41, a highpass filter (HPF) 42, amplitude compressors 43 and 44 having a fixed compression ratio and an adder 45. The input signal is input to the LPF 41 and HPF 42, and the output signals of LPF 41 and HPF 42 are input respectively to the amplitude compressors 43 and 44. The output signals of the amplitude compressors 43 and 44 are added by the adder 45, from which the output signal of the variable amplitude compressor is taken out. The cutoff frequency of the LPF 41 and HPF 42 is set to a certain frequency ω0.

Figure 11A:
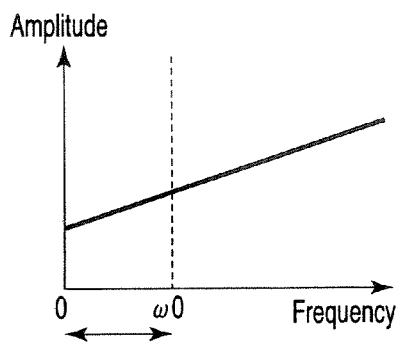
FIGS. 11A and 11B illustrate examples of the compression characteristics of the amplitude compressor of FIG. 10.
Figure 11B:
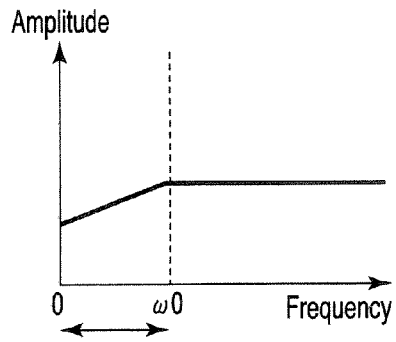
Figure 12:
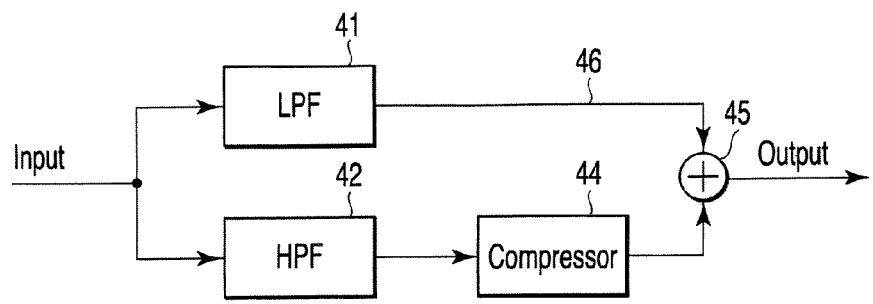
FIG. 12 is a block diagram showing an amplitude compressor obtained by simplifying the amplitude compressor of FIG. 10 corresponding to the compression characteristics of FIGS. 11A and 11B.

In the variable amplitude compressor of FIG. 10, when a signal having a certain amplitude characteristic is input, the compression characteristic changes depending on whether the frequency of the input signal is higher than a certain frequency (here, ω0). For example, when a signal having the amplitude characteristic shown in FIG. 11A is input to the variable amplitude compressor, if the input signal is a signal of a frequency band lower than ω0 as shown in FIG. 11B, i.e., the output signal of LPF 41, it is not subjected to amplitude compression by the amplitude compressor 43. If the input signal is a signal of a frequency band higher than ω0, i.e., the output signal of HPF 42, it is subjected to amplitude compression by fixing the amplitude of the output signal with respect to the amplitude transition of the input signal by the amplitude compressor 44.

In such manner, the variable amplitude compressor in FIG. 10 does not perform amplitude compression in a frequency band in which the frequency of the input signal is lower than ω0 (0 to ω0), however, performs amplitude compression only in a frequency band higher than ω0. According to the compression characteristic of FIG. 11B, since the amplitude compressor 43 in FIG. 10 does not perform amplitude compression, this compression characteristic may be achieved by replacing the amplitude compressor 43 with a direct pass 46.

As described, in a frequency band in which the frequency of the input signal is higher than ω0, a correlation independent of an amplitude but dependent only on a phase can be obtained by compressing the amplitude of the output signal to a fixed value. Consequently, since a steep peak is generated by an inverse orthogonal transformation, watermark information can be easily detected. Meanwhile, in a frequency band in which the frequency of the input signal is lower than ω0, i.e., the frequency band corresponding to an amplitude range subject to major influence from an attack, the watermark information can be detected while curbing the influence from an attack by avoiding compressing the amplitude of the input signal. Here, as an example, the amplitude compressor 43 in FIG. 10 is explained to not perform amplitude compression. However, the amplitude compressor 43 may perform amplitude compression by a compression ratio smaller than the amplitude compressor 44.

Figure 13:
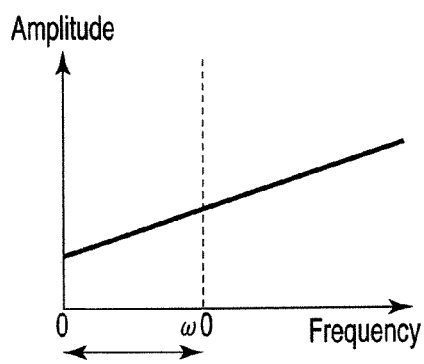
FIGS. 13A and 13B illustrate other examples of the compression characteristics of the amplitude compressor of FIG. 10.
Figure 13:
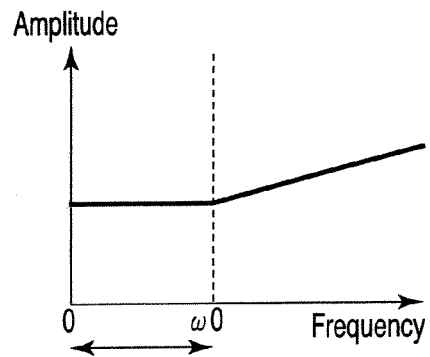
Figure 14:
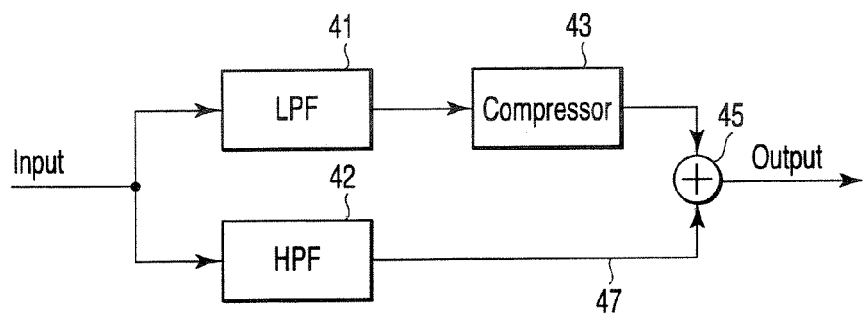
FIG. 14 is a block diagram showing an amplitude compressor obtained by simplifying the amplitude compressor of FIG. 10 corresponding to the compression characteristics of FIGS. 13A and 13B.

Further, the variable amplitude compressor of FIG. 10 performs amplitude compression by fixing the amplitude of the output signal to a constant value as shown in FIG. 13B with respect to the amplitude transition of the input signal of the amplitude characteristic as shown in FIG. 13A when the frequency of the input signal is lower than ω0. When the frequency of the input signal is higher than ω0, the variable amplitude compressor needs not perform the amplitude compression. In other words, to the contrary to the compression characteristic of FIG. 11B, the amplitude compression is performed only in a frequency band in which the frequency of the input signal is lower than ω0 (0 to ω0), and the amplitude compression is not performed in a frequency band higher than ω0. The compression characteristic of FIG. 13B is effective in the case where the influence from an attack significantly appears in a relatively high frequency band. In the compression characteristic of FIG. 13B, since the amplitude compressor 44 in FIG. 10 does not perform amplitude compression, this compression characteristic may be achieved by replacing the amplitude compressor 44 with a direct pass 47 as shown in FIG. 14.

As stated, in a frequency band in which the frequency of the input signal is lower than ω0, a correlation independent of an amplitude but dependent on only a phase can be obtained by compressing the amplitude of the output signal to a fixed value. Consequently, since a steep peak is generated by an inverse orthogonal transformation, the watermark information can be easily detected. Meanwhile, in the frequency band in which the frequency of an input signal is higher than ω0, i.e., in a frequency band corresponding to an amplitude range suffering significant influence from attack, the watermark information can be detected while the influence from an attack is curbed by avoiding compressing the amplitude of the input signal. Here, as an example, the amplitude compressor 44 in FIG. 10 is explained as not performing amplitude compression. However, the amplitude compressor 44 may perform amplitude compression by a compression ratio smaller than the amplitude compressor 43. Moreover, instead of compressing the amplitude of a particular frequency band of the output signal, it is also fine to use a method to compress the amplitude of the particular amplitude range to a fixed value.

Figure 15A:
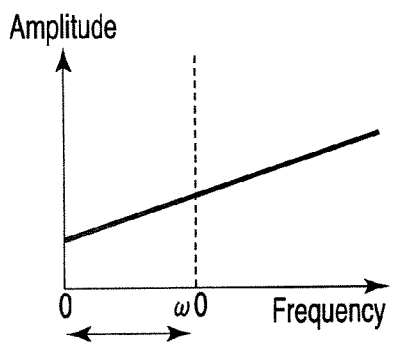
FIGS. 15A, 15B and 15C illustrate other examples of the compression characteristics of the amplitude compressor of FIG. 10.
Figure 15B:
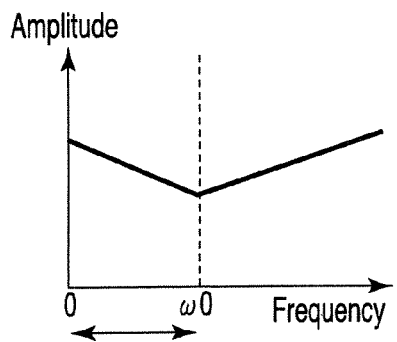
Figure 15C:
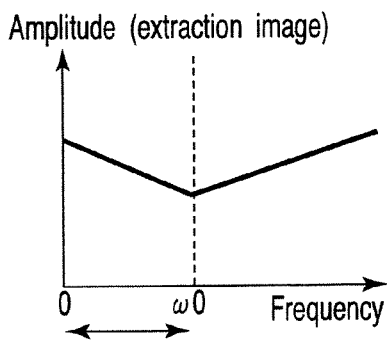

Another example of a compression characteristic of the variable amplitude compressor of FIG. 10 will be explained using FIGS. 15A to 15C. An amplitude of an orthogonal transformation image of an extraction image (which corresponds to the output signal of the orthogonal transformation unit 22B in FIG. 3) can be described as FIG. 15C with respect to the signal of the amplitude characteristic as shown in FIG. 15A. In this case, compression is performed so that the amplitude characteristic of FIG. 15A approaches the amplitude characteristic of FIG. 15C in a particular frequency band (in this example, 0 to 0ω) as shown in FIG. 15B. Instead of the method of compressing the amplitude characteristic of FIG. 15A in the particular frequency band so as to approach the amplitude characteristic of FIG. 15C, it is also fine to use a method of compressing the amplitude in the particular amplitude range so as to approach the amplitude characteristic of FIG. 15C.

Figure 16A:
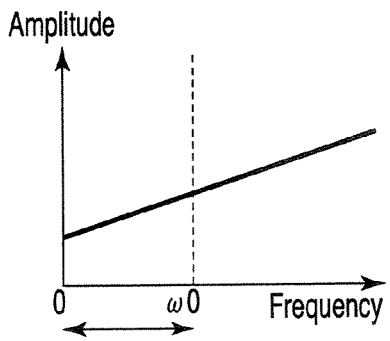
FIGS. 16A, 16B and 16C illustrate yet other examples of the compression characteristics of the amplitude compressor of FIG. 10.
Figure 16B:
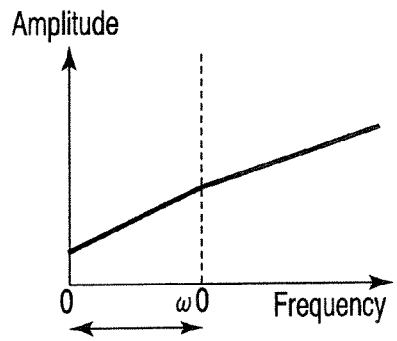
Figure 16C:
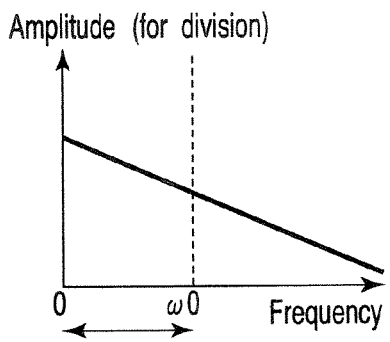

A further another example of the compression characteristic of the variable amplitude compressor of FIG. 10 will be explained using FIG. 16. Suppose the amplitude (amplitude for division) used for amplitude compression can be described as in FIG. 16C with respect to the signal of the amplitude characteristic as shown in FIG. 16A. The amplitude for division in FIG. 16C takes a small value in a particular frequency band (in this example, a frequency exceeding band ω0) and generates a steep peak in the amplitude when dividing the amplitude of FIG. 16C. When the steep peak is generated in the amplitude upon division of the amplitude in this manner, the correlation may oscillate by an inverse orthogonal transformation. Therefore, in order to prevent the steep peak in the amplitude from occurring in the particular frequency band, compression is carried out so that the amplitude characteristic of the particular frequency band (in this example, frequency band from 0 to ω0) becomes steep as in FIG. 16B.

THIRD SPECIFIC EXAMPLE OF A VARIABLE AMPLITUDE COMPRESSOR

A variable amplitude compressor 50 shown in FIG. 17 is configured to switch compression characteristics so that the variation of amplitude due to attacks estimated by the attack estimation unit 51 is minimized. For example, when a signal of the amplitude characteristic as shown in FIG. 8A is input, and a frequency band having an amplitude smaller than the threshold value A0 suffers significant influence from an attack, the influence from the attack may be reduced by not performing amplitude compression in the frequency where the amplitude is smaller than A0 as shown in FIG. 8B.

FOURTH SPECIFIC EXAMPLE OF A VARIABLE AMPLITUDE COMPRESSOR

FIG. 18 is a fourth specific example of preferable amplitude compressors 33, 34, 43 and 44 shown in FIGS. 7, 9, 10, 12 and 14. Amplitude compression is performed by combining a multiplier-divider 69 for (a) an amplitude of an orthogonal-transformed image 65 of a watermark embedded image 61, (b) an amplitude of an orthogonal-transformed image 67 of an extracted image 62, (c) an amplitude of an orthogonal-transformed image 66 of the watermark embedded image after applying scaling (enlargement/reduction) process 63, and (e) an amplitude of an orthogonal-transformed image 68 of an extracted image after applying scaling process 64. By doing so, a variety of amplitude compression can be performed.

Several ways to realize the variable amplitude compressor have been mentioned above. However, it is also possible to perform amplitude compression by combining some of these methods.

<Arithmetic Operation Volume in Orthogonal Transformation>

A calculation amount of a first orthogonal transformation will be explained by citing an example in the case of using an FFT for the first orthogonal transformation. When assuming that the image of the watermark embedded image signal 201 is N rows×M columns, the equation of the arithmetic operation volume of FFT (in this case, a two dimensional FFT) is described as follows:

$$\frac{1}{2} \times N \times (\text{Log}M + \text{Log}N) \quad (3)$$

Here, in order to use three orthogonal transformations (the first orthogonal transformation of the two images and the second orthogonal transformation of the complex addition image) in the present embodiment, the following calculation amount is required:

$$\frac{3}{2} \times N \times M \times (\text{Log}M + \text{Log}N) \quad (4)$$

Second Embodiment (Digital Watermark Embedding Apparatus)

Figure 19:
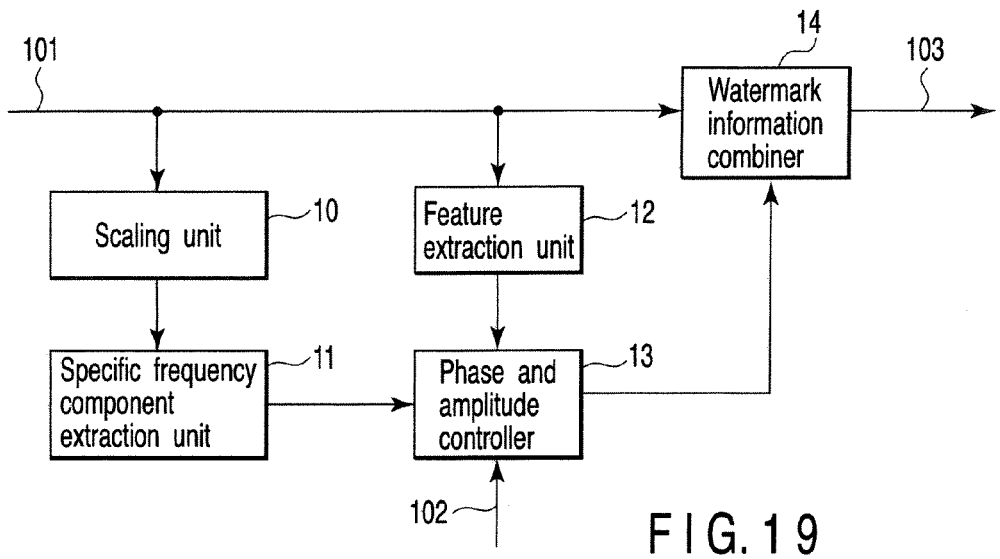
FIG. 19 is a block diagram of a digital watermark embedding apparatus according to a second embodiment.

FIG. 19 shows a digital watermark embedding apparatus according to a second embodiment of the present invention. A scaling (enlargement/reduction) unit 10 is added to the digital watermark embedding apparatus according to the first embodiment shown in FIG. 1. The embedding target image signal 101 is input to the scaling unit 10, feature quantity extraction unit 12 and watermark information combiner 14. The scaling unit 10 is comprised of a digital filter of a frequency domain and generates a scaling image signal by scaling the embedding target image signal 101 with a certain scaling rate. For example, if the scaling rate is 0.5, a reduction signal is generated as the scaling image signal. The scaling image signal output from the scaling unit 10 is input to the specific frequency component extraction unit 11.

The specific frequency component extraction unit 11 comprises a digital filter of a frequency domain, such as a lowpass filter or highpass filter possessing a predetermined cutoff frequency, or bandpass filter possessing a predetermined passband center frequency and extracts a certain frequency component, e.g., a relatively high frequency component, within the embedding target image signal 101 from the scaling image signal. In the following, the output signal from the specific frequency component extraction unit 11 is referred to as a specific frequency component signal.

The specific frequency component signal output from the specific frequency component extraction unit 11 is input to the phase/amplitude controller 13 where at least one of the phase and amplitude is controlled. Digital information to be embedded in the embedding target image signal 101, i.e. the watermark information 102, is given to the phase/amplitude controller 13. The phase/amplitude controller 13 is configured to apply phase control or amplitude control in a predetermined specific control quantity for the specific frequency component signal.

The phase control performed by the phase/amplitude controller 13 is, for instance, realized by a single or plurality of digital phase shifters. The phase control quantity is provided depending on the phase shift quantity of the phase shifter. For example, at the phase/amplitude controller 13, the specific frequency component signal is simply subject to a phase shift maintaining the waveform as shown in the example of FIG. 2. The amplitude control performed by the phase/amplitude controller 13 is realized by, for instance, a single or a plurality of exclusive circuits or digital multipliers, and the amplitude control quantity is given by the coefficient multiplying the specific frequency component signal. The phase control quantity (phase shift quantity) and amplitude control quantity (coefficient) of the phase/amplitude controller 13 are controlled in accordance with the watermark information 102.

Meanwhile, the feature quantity extraction unit 12 extracts a feature quantity, e.g., an activity showing the complexity of an image, of the embedding target image signal 101. The information on feature quantity is input to the phase/amplitude controller 13, where the phase control quantity (phase shift quantity) and the amplitude control quantity (coefficient) are controlled in accordance with the input feature quantity. Further, the feature quantity extraction unit 12 is not fundamental, therefore, may be omitted.

The specific frequency component signal undergone phase control and amplitude control by the phase/amplitude controller 13 is supplied to the watermark information combiner 14, which comprises a digital adder, as an embedding signal and combines with the embedding target image signal 101. In other words, the specific frequency component signal extracted by the specific frequency component extraction unit 11 undergoes phase control and amplitude control specific to the digital watermark embedding apparatus by the phase/amplitude controller 13, and, at the same time, either one or both of phase control quantity and amplitude control quantity are subject to control by the watermark information 102. As a result, the watermark information 102 is embedded in the embedding target image signal 101 and a watermark embedded image 103 is generated by the watermark information combiner 14.

A plurality of channels may exist for the specific frequency component signal extracted by the specific frequency component extraction unit 11 and undergone phase control and amplitude control by the phase/amplitude controller 13. In such case, the plurality of channel specific frequency component signals are combined with the embedding target image signal 101 by the watermark information combiner 14.

The thus-obtained watermark embedded image signal 103 is recorded on a recording medium by, for example, a digital image recording/reproducing apparatus, such as a DVD system, or transmitted via a transmission medium, such as the Internet, a broadcasting satellite, and a communication satellite.

(Digital Watermark Detection Apparatus)

Figure 20:
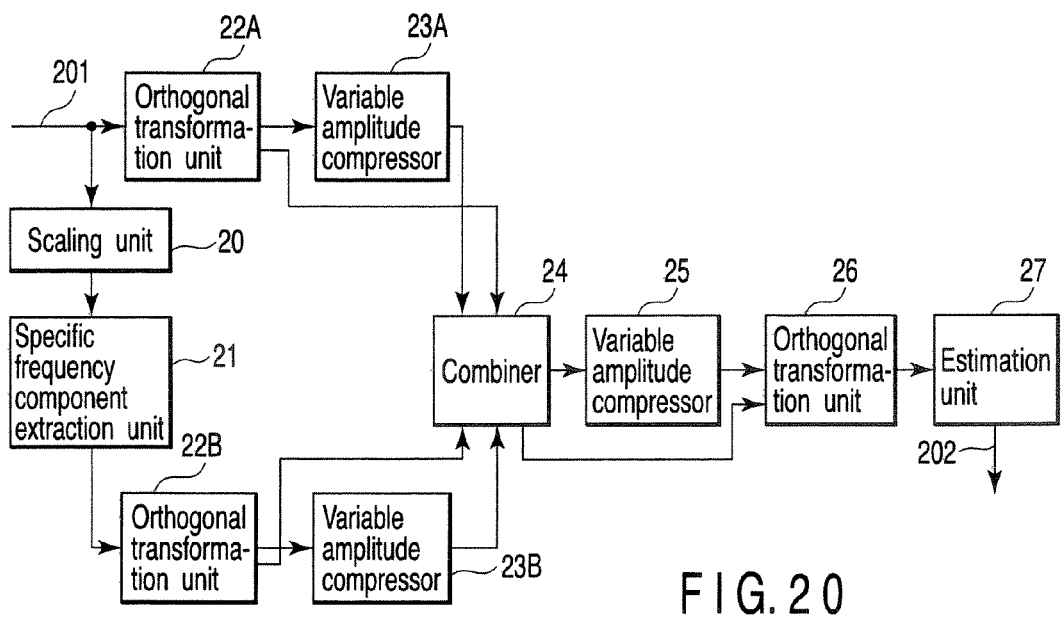
FIG. 20 is a block diagram of a digital watermark detection apparatus according to the second embodiment.

A digital watermark detection apparatus for detecting watermark information from a watermark embedded image signal will be explained using FIG. 20. The digital watermark detection apparatus receives a watermark embedded image signal 201 generated by the digital watermark embedding apparatus shown in FIG. 19 via a recording medium or a transmission medium. Here, it is assumed that a digital signal "1" or "0" is embedded in the watermark embedded image signal 201 as watermark information.

The watermark embedded image signal 201 is input to a scaling unit 20 and an orthogonal transformation unit 22A. The scaling unit 20 comprises a digital filter of a frequency domain and generates a scaled image signal by scaling the watermark embedded image signal 201 by a particular scaling rate likewise the case of the scaling unit 10 within the digital watermark embedding apparatus in FIG. 19. The scaled image signal output from the scaling unit 20 is input to the specific frequency component extraction unit 21.

The specific frequency component extraction unit 21 comprises a digital filter of the same frequency domain as that of the specific frequency component extraction unit 11 within the digital watermark embedding apparatus shown in FIG. 19, such as a lowpass filter or highpass filter possessing a predetermined cutoff frequency, or a bandpass filter possessing a predetermined passband center frequency The specific frequency component extraction unit 21 extracts a specific frequency component, such as a relatively high frequency component from the watermark embedded image signal 201, and outputs the specific frequency component signal. The specific frequency component extraction unit 21 may extract all frequency components from the watermark embedded image signal.

The orthogonal transformation units 22A and 22B subject the watermark embedded image signal 201 and the specific frequency component signals from the specific frequency component extraction unit 21 to orthogonal transformation respectively. The orthogonal transformation units 22A and 22B each output an amplitude component and a phase component separately. The amplitude components output from the orthogonal transformation units 22A and 22B are input to a complex addition unit 24 via variable amplitude compressors 23A and 23B. The phase components output from the orthogonal transformation units 22A and 22B are input directly to the complex addition unit 24. Accordingly, the watermark embedded image signal 201 and the specific frequency component signal from the specific frequency component extraction unit 21 are subjected to the orthogonal transformation and then to complex addition by the complex addition unit 24. The variable amplitude compressors 23A and 23B are as explained in the first embodiment.

The amplitude component and phase component of the signals undergone complex addition are output separately from the complex addition unit 24. The amplitude component output from the complex addition unit 24 is input to an orthogonal transformation unit 26 via a variable amplitude compressor 25. The phase component output from the complex addition unit 24 is input directly to the orthogonal transformation unit 26. The orthogonal transformation unit 26 performs a second orthogonal transformation on the input signal containing the amplitude component and phase component. The second orthogonal transformation is the same transformation as the first transformation carried out by the orthogonal transformation units 22A and 22B or an inverse transformation of the first orthogonal transformation. If, for instance, a fast Fourier transformation (FFT) is used as the first transformation, the orthogonal transformation unit 26 performs an FFT or an inverse FFT (IFFT) as the second orthogonal transformation.

The output signal from the orthogonal transformation unit 26 is input to an estimation unit 27 by which the watermark information embedded in the watermark embedded image signal 201 is estimated and from which the estimated watermark information 202 is output.

(Digital Watermark Detection Sequence)

The sequence of a digital watermark detection method of the present embodiment will be explained using the flow chart shown in FIG. 21.

First of all, a scaling (enlargement/reduction) process is performed on the watermark embedded image signal 201 (step S20). Then, by extracting only the specific frequency component from the scaling image signal, the specific frequency component signal is output (step S21). The watermark embedded image signal 201 and the specific frequency component signal are subjected to the first orthogonal transformation, such as an FFT by the orthogonal transformation units 22A and 22B (step S22A and S22B).

The amplitude components obtained by steps S22A and S22B are subjected to amplitude compression by compression characteristics which vary depending on the amplitude and frequency (steps S23A and 23B). The two amplitude components obtained by the amplitude compression are subjected to complex addition with the phase component obtained by steps S22A and S22B (step S24).

The amplitude component of the signal obtained by complex addition in step S24 is subjected to amplitude compression according to compression characteristics which vary depending on the amplitude and frequency (steps S25). Then, the second orthogonal transformation, e.g. an FFT or an inverse FFT in the case where the first orthogonal transformation is an FFT, is performed on the signal obtained by the amplitude compression in step S25 (step S26). Watermark information 202 is estimated from the signal obtained by the second orthogonal transformation (phase only correlation value), and output (step S27). Since the estimation method for the watermark information which is carried out by the estimation unit 27 is the same as the first embodiment, explanation thereof will be omitted.

Thus, according to the second embodiment, the specific frequency component signal is extracted from the watermark embedded image signal via scaling, and watermark information is detected by cross-correlation for the phase-only correlation value between this specific frequency component signal and watermark embedded image signal. In this case, the peak of the cross-correlation value can be searched for by carrying out correlated calculation while changing the phase shift quantity of the specific frequency component signal. Therefore, it will enable watermark information to be easily detected even from an embedded image signal having undergone scaling attacks. Further, if scaling is performed on the digital watermark embedding apparatus side, watermark information detection may be carried out favorably by the scaling.

The scaling (enlargement/reduction) process in the second embodiment may be replaced with other image processing which may reduce correlation with respect to an original image.

The thus far explained digital watermark detection apparatus may be realized by, for example, using a general computer apparatus as a basic hardware. In other words, the digital watermark detection process explained in FIG. 4 or FIG. 21 can be realized by having the processor build in the above computer apparatus execute a digital watermark detection program. On such occasion, the digital watermark detection apparatus may realize this by installing the above program on the computer apparatus in advance, or by arbitrarily installing this program on the computer apparatus by storing it in a recording medium such as a CD-ROM or by distributing the above program through a network. Moreover, the procurement of the watermark embedded image signal may be realized by arbitrarily utilizing a recording medium such as a built-in or external memory to the above computer apparatus, a hard disk, CD-R, CD-RW, DVD-RAM or DVD-R.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A digital watermark detection method comprising:
   extracting a specific frequency component signal from an input image signal;
   subjecting the input image signal to orthogonal transformation to generate a first transformed image signal;
   subjecting the specific frequency component signal to orthogonal transformation to generate a second transformed image signal;
   combining the first transformed image signal and the second transformed image signal to generate a combined image signal;
   subjecting the combined image signal to orthogonal transformation to generate a third transformed image signal;
   estimating watermark information embedded within the input image signal by searching for a peak appearing in the third transformed image signal; and
   subjecting a target signal to be compressed to amplitude compression based on a compression characteristic which varies according to at least one of an amplitude of the target signal and a frequency of the target signal to obtain a compression signal, the target signal being formed of at least one of the first transformed image signal, the second transformed image signal and the combined image signal.

2. The method according to claim 1, which further comprises subjecting the input image signal to scaling to generate a scaled image signal, and wherein extracting the specific frequency component signal includes extracting the specific frequency component signal within the input image signal from the scaled image signal.

3. A digital watermark detection apparatus comprising:
an extraction unit configured to extract a specific frequency component signal from an input image signal;
a first transformation unit configured to subject the input image signal to orthogonal transformation to generate a first transformed image signal;
a second transformation unit configured to subject the specific frequency component signal to orthogonal transformation to generate a second transformed image signal;
a combination unit configured to combine the first transformed image signal and the second transformed image signal to generate a combined image signal;
a third transformation unit configured to subject the combined image signal to orthogonal transformation to generate a third transformed image signal;
an estimation unit configured to estimate watermark information embedded within the input image signal by searching for a peak appearing in the third transformed image signal; and
a compressor to subject a target signal to be compressed to amplitude compression based on a compression characteristic which varies according to at least one of an amplitude of the target signal and a frequency of the target signal to obtain a compression signal, the target signal being formed of at least one of the first transformed image signal, the second transformed image signal and the combined image signal.

4. The apparatus according to claim 3, which further comprises a scaling unit configured to subject the input image signal to scaling to generate a scaled image signal, and wherein the extraction unit extracts the specific frequency component signal within the input image signal from the scaled image signal.

5. The detection apparatus according to claim 3, wherein the first orthogonal transformation unit and the second transformation unit each comprises a Fourier transformer, and the third transformation unit comprises a Fourier transformer or an inverse Fourier transformer.

6. The apparatus according to claim 3, wherein the compressor compresses the target signal in amplitude to maintain an amplitude of the compression signal at a fixed value in an amplitude range in which the amplitude of the target signal is larger than a threshold value.

7. The apparatus according to claim 3, wherein the compressor compresses the target signal in amplitude to maintain an amplitude of the compression signal becomes at a fixed value in a frequency band in which the frequency of the target signal is higher than a specific frequency.

8. The apparatus according to claim 3, wherein the compressor compresses the target signal in amplitude to minimize variation of an amplitude of the compression signal due to attacks which the input image signal is assumed to have undergone.

9. The detection apparatus according to claim 3, wherein the compressor compresses the target signal in amplitude to maintain an amplitude of the compression signal at a fixed value in the specific frequency band of the target signal.

10. The apparatus according to claim 3, wherein the compressor compresses the target signal in amplitude to maintain an amplitude of the compression signal at a fixed value in the specific amplitude range of the target signal.

11. The apparatus according to claim 3, wherein the compressor compresses the target signal in amplitude to make an amplitude difference between the compression signal and the second transformed image signal in the specific frequency band smaller in comparison to an amplitude difference between the target signal and the second transformed image signal.

12. The apparatus according to claim 3, wherein the compressor compresses the target signal in amplitude to make an amplitude difference between the compression signal and the second orthogonal transformation image signal in the specific amplitude range smaller in comparison to an amplitude difference between the target signal and the second orthogonal transformation image signal in the specific amplitude range.

13. The apparatus according to claim 3, wherein the compressor compresses the target signal in amplitude to control a peak of amplitude of the compression signal in the specific frequency band of the target signal.

14. The apparatus according to claim 3, wherein the compressor compresses the target signal in amplitude to control a peak of amplitude of the compression signal in the specific amplitude range of the target signal.

15. A computer readable medium storing a digital watermark detection program for causing a computer to perform digital watermark detection process, the program comprising:
means for causing the computer to extract a specific frequency component signal from an input image signal;
means for causing the computer to subject the input image signal to orthogonal transformation to generate a first transformed image signal;
means for causing the computer to subject the specific frequency component signal to orthogonal transformation to generate a second transformed image signal;
means for causing the computer to combine the first transformed image signal and the second transformed image signal to generate a combined image signal;
means for causing the computer to subject the combined image signal to orthogonal transformation to generate a third transformed image signal;
means for causing the computer to estimate watermark information embedded within the input image signal by searching for a peak appearing in the third transformed image signal; and
means for causing the computer to subject a target signal to be compressed to amplitude compression based on a compression characteristic which varies according to at least one of an amplitude of the target signal and a frequency of the target signal to obtain a compression signal, the target signal being formed of at least one of the first transformed image signal, the second transformed image signal and the combined image signal.

* * * * *